Patented Oct. 3, 1950

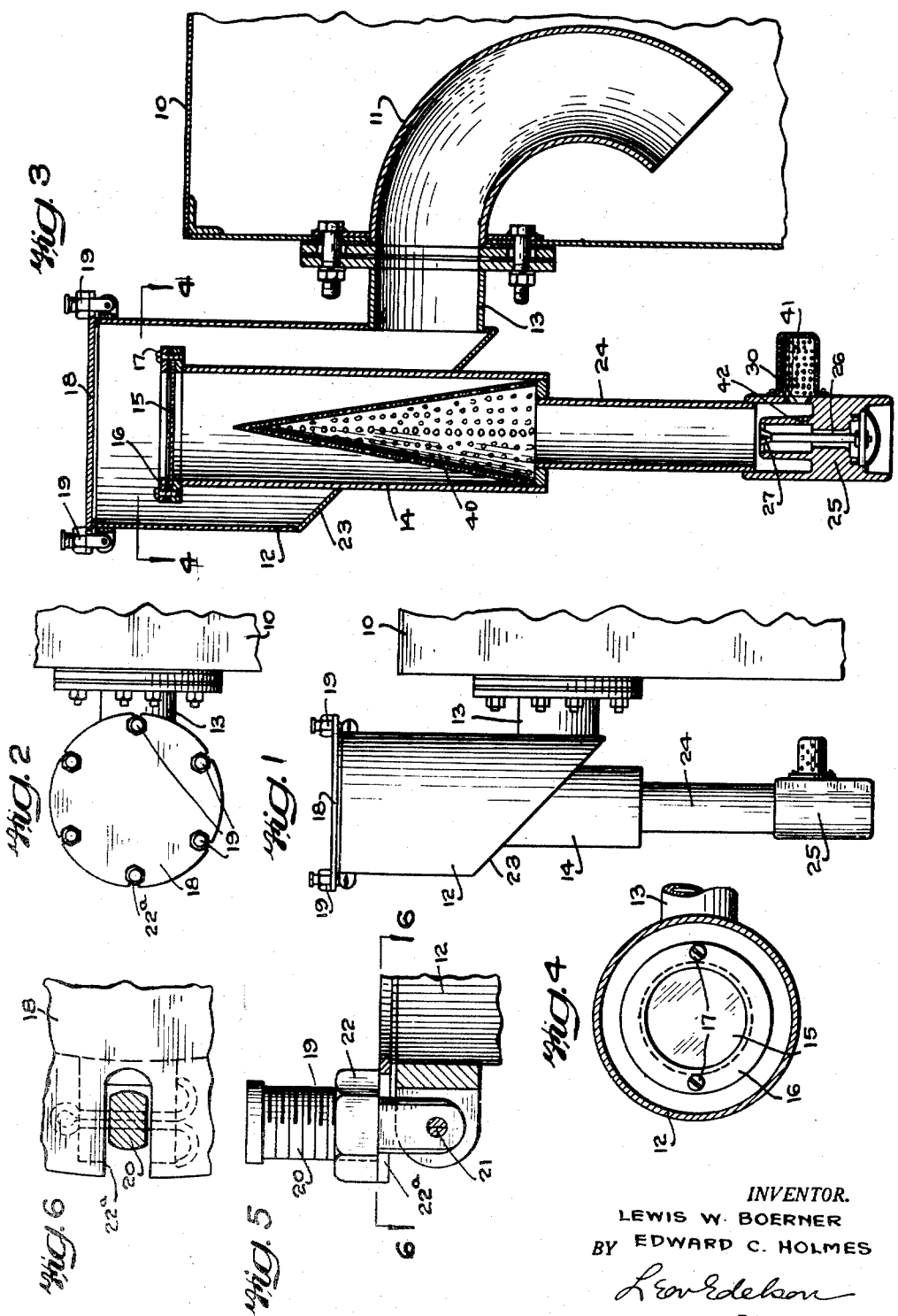

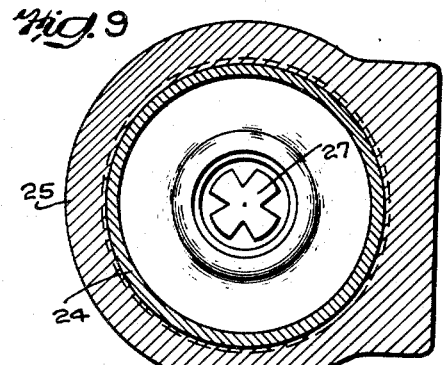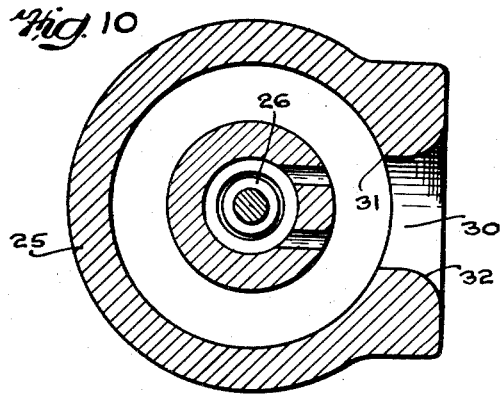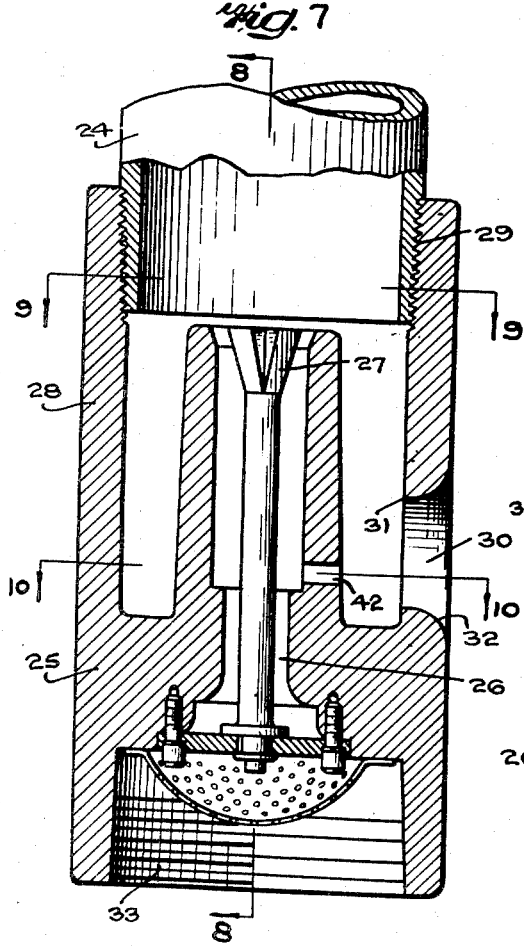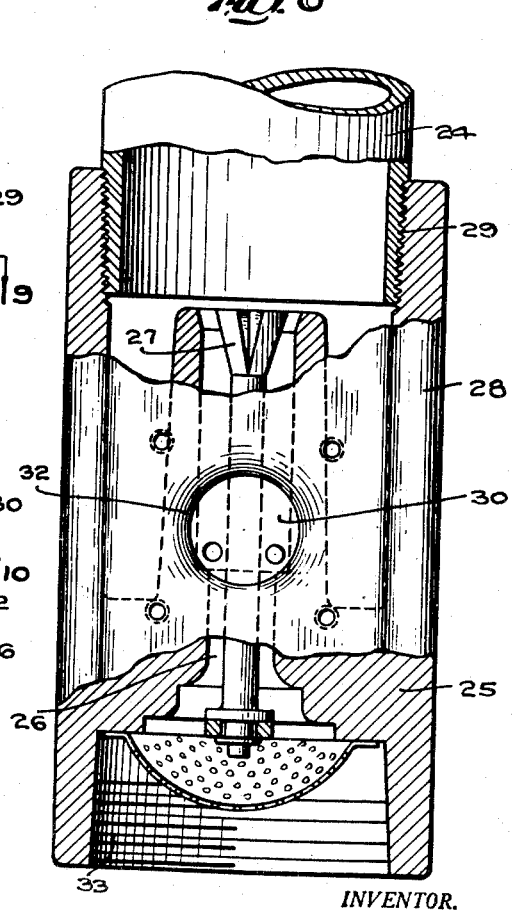

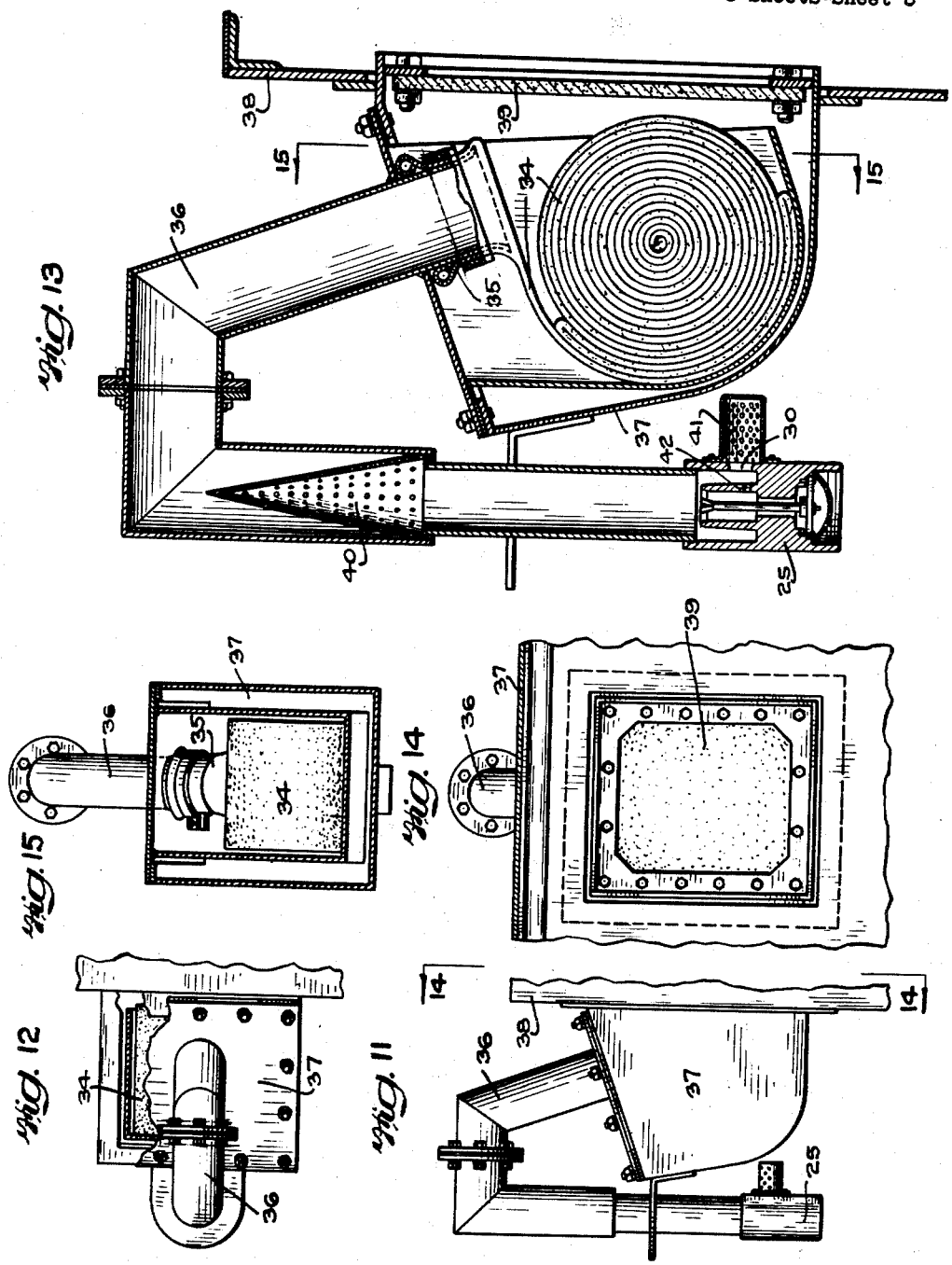

2,524,421

UNITED STATES PATENT OFFICE 2,524,421

FOAM PRODUCING APPARATUS

Lewis W. Boerner, Newtown Square, and Edward C. Holmes, West Chester, Pa., assignors to National Foam System, Inc., Philadelphia, Pa., a corporation of Delaware Application March 19, 1946, Serial No. 655,416

3 Claims. (Cl. 261—116)

This invention relates generally to apparatus for use in the production of mechanical or air foam employed in the extinguishment of fires, and more particularly to an improved construction of foam chamber adapted for the delivery of the fire-extinguishing foam to the interior of sealed tanks containing inflammable liquids such as oil or gasoline.

The employment of foam chambers for delivering chemical foam to the interior of oil tanks and the like is well known in the art and the successful operation of such chambers has encountered no particular difficulties, due primarily to the fact that the generation of chemical foam results in the production of a positive foam pressure adequate to rupture the frangible diaphragm with which such chambers are normally equipped to seal the interior of the tank against the escape into atmosphere of inflammable vapors emanating from the liquid stored in the tank. Further, in the production of chemical foam, the foam chamber and the supply conduits leading thereto are completely sealed from atmosphere in consequence of which the foam delivered into the chamber almost immediately builds up to a pressure sufficient to break the diaphragm which seals off the foam chamber from the interior of the tank.

The problem of delivering mechanical foam into the interior of an oil tank or the like by way of a foam chamber has involved considerable difficulties, because in the production of mechanical foam air from atmosphere is required to be drawn into the foam-forming solution. In order to effect such entrainment of air into the stream of foam-forming solution delivered to the foam chamber, some means must be provided for permitting the entrainment of atmosphere air into the foam-forming solution in the immediate vicinity of the discharge of the latter into the conduit leading to the foam chamber. In addition, such means must of necessity be so operative that while it functions satisfactorily to allow air to be drawn into the foam-forming solution in an amount sufficient to produce an adequate volume of foam, it also functions to enable the foam-forming solution, prior to any entrainment of air thereinto, to develop a pressure in the foam chamber sufficient to disrupt the diaphragm of the latter. Once the diaphagm of the foam chamber is ruptured to thereby provide direct communication between the foam chamber and the interior of the storage tank containing the inflammable liquid, air is drawn into the stream of the foam-forming liquid to produce foam for delivery into the interior of the tank.

While the present invention is primarily designed for use in connection with the production and delivery of foam to the interior of tanks for the protection thereof against fire, it is to be understood that the apparatus as constructed in accordance with and embodying the principles of the present invention is capable of general application for the production of foam. Thus, it may be employed wherever it is desired to introduce air or any other gaseous medium into a flowing stream of foam-forming liquid and wherein the stream of liquid is itself initially employed through its own pressure to effect a free passage for the foam through its discharge tube or conduit, the air inlet hereinbefore referred to being of such design and so operative as to permit the entrainment of the gaseous medium into the flowing stream of liquid only after the latter flows freely through the foam delivery conduit.

It is, accordingly, among the objects of the present invention to provide an apparatus which is devoid of all moving parts, which is exceedingly simple in design and efficient in operation, and which will operate in the manner and for the purposes above described, such apparatus including a foam delivery tube or conduit, the inlet end of which is connected to a foam-generating unit including a nozzle from which the foam-forming liquid discharges and an air inlet through which air from atmosphere is drawn into the liquid as the latter is delivered through the foam delivery tube, said air inlet being of such design that it operates to permit the entrainment of air into the foam-forming liquid only after the latter has developed sufficient pressure in the foam delivery tube to open the same for free passage of the liquid therethrough.

Other objects and advantages of the present invention will appear more fully hereinafter, it being understood that the present invention consists substantially in the combination, construction, location and relative arrangement of parts, all as will be described more fully hereinafter, as shown in the accompanying drawings and as finally pointed out in the appended claims. In the accompanying drawings, which illustrate certain preferred embodiments of the present invention;

Figure 1 is a side elevational view of the apparatus as constructed in accordance with and embodying the principles of the present invention;

Figure 2 is a top plan view of said apparatus;

Figure 3 is a vertical sectional view of the apparatus;

Figure 4 is a horizontal sectional view taken on the line 4—4 of Figure 3;

Figure 5 is a view, partly in section, showing a detail of the apparatus;

Figure 6 is a sectional view taken on the line 6—6 of Figure 5;

Figure 7 is an enlarged vertical sectional view of the foam-forming unit;

Figure 8 is a view, partially in elevation; taken on the line 8—8 of Figure 7;

Figures 9 and 10 are horizontal sectional views taken respectively on the lines 9—9 and 10—10 of Figure 7;

Figure 11 is a side elevational view of a modified form of the apparatus designed for operation in association with a Moeller tube;

Figure 12 is a top plan view thereof;

Figure 13 is a vertical sectional view of the apparatus shown in Figure 11;

Figure 14 is an elevational view of the apparatus as taken along the line 14—14 of Figure 11; and Figure 15 is a view thereof as taken along the line 15—15 of Figure 13.

Referring now to the drawings and more particularly to Figures 1 to 10 thereof which illustrate one embodiment of the present invention, it will be observed that in the arrangement therein shown the apparatus is secured to the side of an oil storage tank 10 or the like in which is fitted a foam discharge chute 11 of any suitable form. Preferably, the chute 11 is curved downwardly and laterally, as shown, in order to direct the foam against the inner surface of the wall of the tank and so provide for the flow of foam downwardly along the tank wall to the level of the liquid in the tank. This foam chute 11 is in communication with a foam chamber 12 by way of interconnecting lateral conduit 13, the foam chamber 12 being in turn fitted with a conduit 14, the upper portion of which is disposed internally of the chamber 12 and concentrically with respect thereto to provide an annular space between the concentric walls of the chamber 12 and the conduit 14.

The upper end of the conduit 14 is fitted with a frangible diaphragm 15 of glass or other suitable material, the normal function of which is to seal off from atmosphere the interior of the tank 10. Preferably, the sealing diaphragm 15, which is rupturable at a pre-determined pressure, is removably secured in position by means of a holding ring 16 fastened to the conduit 14 by the screws 17. The upper end of the chamber 12 is closed by a cover plate 18 removably secured in place by a plurality of clamping devices 19 of the form best shown in Figures 5 and 6, each of said devices including a screw element 20 hinged, as at 21, to the conduit and a cooperating nut 22 threaded on the screw element 20. The cover plate 18 is notched as at 22ª to receive the screw elements when the latter are swung into upright position, as shown in Figure 5, the plate being then locked to the conduit 14 by tightening the nuts 22 on the screw elements. To remove the cover plate, the nuts 22 are loosened sufficiently to permit the screw elements to be swung about their pivots free of the cover plate, it being noted that the opening covered by the plate 18 is sufficiently ample to provide for ready access to the diaphragm 15 for servicing and replacement thereof.

The bottom 23 of the foam chamber 12 is inclined downwardly and toward the foam chute 11 to facilitate ready flow of the generated foam from the chamber and into the discharge chute, the conduit 14 being welded or otherwise secured centrally within said inclined bottom wall 23 of the chamber. The lower end of the conduit 14 is connected to a vertical delivery tube 24, the lower end of which latter is fitted with a nozzle unit 25 through which the foam-forming solution is discharged into the tube 24 under suitable pressure. While any suitable nozzle unit capable of discharging the foam-forming solution in the form of a finely divided stream may be employed, it is preferred to employ a form of nozzle such as is illustrated more particularly in Figures 7 to 10 inclusive. In this preferred form of discharge nozzle, the foam-forming solution is delivered under suitable pressure into the restricted passage 26 from whence it issues in the form of a high velocity jet. The terminal end of the passage 26 is fitted with a fluted conical element 27 which coacts with the flared terminal end of the nozzle to effect the high velocity projection therefrom of the foam-forming solution in the form generally of an outwardly flaring conical stream, it being well known and understood in the art that upon the entrainment of air from atmosphere in such a stream foam is produced suitable for fire-extinguishing purposes. Foam so produced is known as mechanical or air foam.

The present invention is concerned primarily with the means for effecting this entrainment of air into the high-velocity stream of the foam-forming solution and with the related problem of rupturing the diaphragm 15 immediately as it becomes necessary to produce and deliver foam into the interior of the tank 10. Normally, in the conventional apparatus for producing mechanical foam, the foam-forming stream issuing from the high velocity discharge nozzle is freely exposed to atmosphere and consequently such apparatus could not be employed to develop a pressure adequate to rupture a diaphragm sealing the end of the foam discharge tube. The foam as developed would simply back out of the rear end of the tube open to atmosphere.

The present invention overcomes this difficulty by enclosing the discharge nozzle unit 25 within a housing 28, the free end of which is secured to the end of the tube 24, as at 29, and in then providing such housing with an orifice 30 in the side wall thereof of such shape and design as initially permits the development in the tube 24 of the necessary hydraulic pressure to rupture the diaphragm 15 and thereafter permits the entrainment of air from atmosphere into the stream of the foam-forming solution to produce the foam as required. This orifice 30 is shown most clearly in Figures 3, 7, 8 and 10, wherein it will be observed that it is of gradually increasing area in the direction radially outward of the wall of the nozzle-enclosing housing or shell 28. The inner surface of the orifice 30 is preferably smoothly curved from the inner end thereof of smallest diameter toward its outer end of largest diameter. Also preferably, the inner end of the orifice 30 is sharp-edged, as at 31, while its outer end 32 is of flaring, curved-edge form.

In the operation of the apparatus, the orifice 30 serves essentially as an air inlet port for the admission of air (or other gaseous medium) into the stream of foam-forming solution passing into and through the foam conveying tube 24 and the conduit 14 connected thereto. However, the area and shape of the orifice 30 so far restricts its effective opening in the direction outwardly thereof that it is insufficient to prevent the development of an hydraulic pressure in the conduit 14 adequate to effect rupture of the frangible diaphragm 15. Thus, during the initial phase of operation of the apparatus, while part of the pressure of the liquid delivered into the conduit 14 may be lost through lateral discharge of the liquid by way of the orifice 30, the latter is of such design and so proportioned relatively to the internal passages of the tube 24 and conduit 14 that the remaining pressure of the liquid discharged into the conduit is sufficiently high to effect rupture of the frangible seal 15 in the case of the arrangement illustrated in Figures 1 to 5, or to clear the foam-conveying tube of any obstruction that may be contained therein and which would interfere with the free passage of foam therethrough, such as an air-bound column of water, condensation, accumulation of debris and the like.

In its primary function, the orifice 30 serves as the inlet for air from atmosphere after the diaphragm 15 has been ruptured to effect free communication between the foam chamber 12 and the interior of the tank 10. When the diaphragm has thus been broken, the foam-forming solution passes freely into the tank 10 by way of the tube 24, conduit 14, the foam chamber 12 and the chute 11, its discharge velocity at the nozzle 25 being of such order as to draw air from atmosphere into the stream by way of the orifice 30. The flow of air inwardly of the orifice is facilitated by the fact that its entrance end (for the air or other gaseous medium) is flared, it having been observed that this rounded edge form of the outer end of the orifice efficiently insures the entrainment of air into the stream of the foam-forming solution in amount sufficient to form an adequate volume of foam. While the orifice 30 is shown as circular, it is understood that it may be of any desired configuration, provided that it is restricted in extent with reference to the circumference of the nozzle embracing shell in that it extends over only a small portion of that circumference and providing further that the orifice is bounded by an outwardly divergent peripheral wall as described above. It will be understood, of course, that the inlet end of the nozzle unit 25, which is internally threaded as at 33, is suitably coupled to a conduit (not shown) connected with the source of supply of the foam-forming solution under pressure.

Figures 11 to 15, inclusive, illustrate the application of the present invention to a tank protective installation of the type wherein is employed the so-called Moeller tube, designated generally in the figures by the reference numeral 34. The Moeller tube and its application for fire-extinguishing purposes is described more particularly in United States Letters Patent No. 1,889,101, granted November 29, 1932, to which reference is herein made. This tube, which is formed of any suitable fire-resistant material freely permeable to foam (such as asbestos threads woven into a loose mesh cloth) is connected at one end 35 to a foam discharge conduit 36 which is in communication with the discharge end of the foam-forming nozzle unit 25. The latter is enclosed within the shell or housing having in its side wall the orifice 30 exactly of the form and operating characteristics previously described.

The tube 34 in flattened condition is preferably coiled and housed within a chamber 37 secured to the outside of the wall of the tank 38, this chamber 37 being sealed from the interior of the tank by means of a frangible diaphragm 39. The operation of the apparatus as shown in Figures 11 to 15 insofar as concerns the principles of the present invention is essentially the same as in the case of the arrangement previously described. Thus, upon supplying foam-forming liquid to the nozzle under pressure, the orifice 30 initially operates as a restricted port of such order as not to interfere with the development of an hydraulic pressure sufficient to expand the tube 34 and so effect rupture of the diaphragm 39. Immediately as the diaphragm is ruptured, the tube 34 is projected outwardly of its casing 37 and into the tank where it floats in extended form upon the surface of the liquid contained in the tank. Thereafter, and while the foam-forming solution is passing freely through the conduit 36 and its connected tube 34, the back-pressure in the vicinity of the nozzle unit 25 is relieved to an extent sufficient to permit the entrainment of air, by way of the orifice 30, into the high velocity stream issuing from the nozzle. Foam is thus produced and delivered through the conduit 36 and the tube 34 into the interior of the tank.

If desired, the conduit 14 in the form of the apparatus shown in Figure 3 and the conduit 36 in the form of that shown in Figure 13 may each be provided with an internal conical screen 40 for the purpose of reducing the velocity of flow of the foam through the conduit and at the same time insure more intimate mixing with the foam-forming solution of the air entrained therewith. The use of such screens is, however, not indispensable and the same forms no part of the present invention. The orifice 30, in either instance illustrated, may be protected against injury and the entry therein of foreign matter by a screen 41 suitably secured externally of the nozzle unit to encompass the orifice 30. Also, if desired, the central passage 26 of the nozzle unit 25 may be provided, as shown in Figures 3, 7 and 9, with a lateral opening 42 to serve as an atmospheric relief vent to break any vacuum that may tend to be created internally of the passage 26 and so interfere with the free passage of the liquid therethrough.

It will be understood that the present invention is susceptible of various changes and modifications which may be made from time to time without departing from the general principles or real spirit thereof, and it is, accordingly, intended to claim the same broadly, as well as specifically, as indicated in the appended claims.

What is claimed as new and useful is:

1. Apparatus for introducing foam into tanks containing flammable liquids comprising a foam delivery conduit, a nozzle fitted in the entrance end of said conduit for effecting the discharge into said conduit of a stream of foam-forming liquid supplied to the nozzle under super-atmospheric pressure, a coaxial shell for the nozzle arranged in embracing relation with respect thereto for substantially enclosing it from the surrounding atmosphere, means normally sealing the interior of the tank against free communication with said conduit, said means including a diaphragm rupturable upon the development of a pre-determined pressure of the liquid discharged into said nozzle-embracing shell, and a restricted air port in the wall of said conduit open to atmosphere and adapted to restrict the flow of said liquid outwardly thereof while said seal is intact thereby building up a back pressure sufficient to break the seal and thereafter permitting the free passage of air inwardly of the port upon rupture of said seal, said port comprising an orifice bounded by an outwardly divergent peripheral wall.

2. In an apparatus of the character defined in claim 1 wherein said foam delivery conduit is provided at its discharge end with a coiled flexible tube of foam-permeable fire-resistant material, said coiled tube being housed within a chamber sealed from the interior of a tank containing a flammable liquid by a rupturable diaphragm and being capable of being distended under pressure of said foam-forming liquid to rupture said diaphragm whereby foam conveyed by said conduit and tube may be delivered into the interior of the tank.

3. The apparatus set forth in claim 1 wherein the diaphragm is secured to the outlet end of the foam delivery conduit, and a foam chamber in free communication with the interior of the tank and enclosing said outlet end.

LEWIS W. BOERNER.
EDWARD C. HOLMES.

REFERENCES CITED

The following references are of record in the file of this patent:

UNITED STATES PATENTS

| Number | Name | Date |
|---|---|---|
| 1,518,595 | Mauran | Dec. 9, 1924 |
| 2,146,605 | Timpson | Feb. 7, 1939 |
| 2,158,015 | Sammis | May 9, 1939 |
| 2,373,009 | Bedford | Apr. 3, 1945 |